(12) United States Patent
Lei et al.

(10) Patent No.: US 12,471,116 B2
(45) Date of Patent: Nov. 11, 2025

(54) METHOD AND APPARATUS FOR RESOURCE ALLOCATION FOR SIDELINK COMMUNICATION

(71) Applicant: Lenovo (Beijing) Limited, Beijing (CN)

(72) Inventors: Haipeng Lei, Haidian District (CN); Xiaodong Yu, Haidian District (CN); Zhennian Sun, Chaoyang District (CN); Haiming Wang, Xicheng District (CN)

(73) Assignee: Lenovo (Beijing) Limited, Beijing (CN)

( * ) Notice: Subject to any disclaimer, the term of this patent is extended or adjusted under 35 U.S.C. 154(b) by 487 days.

(21) Appl. No.: 17/914,695

(22) PCT Filed: Mar. 27, 2020

(86) PCT No.: PCT/CN2020/081546
§ 371 (c)(1),
(2) Date: Sep. 26, 2022

(87) PCT Pub. No.: WO2021/189394
PCT Pub. Date: Sep. 30, 2021

(65) Prior Publication Data
US 2023/0379939 A1   Nov. 23, 2023

(51) Int. Cl.
*H04W 72/25* (2023.01)
*H04W 72/1263* (2023.01)
*H04W 76/20* (2018.01)

(52) U.S. Cl.
CPC ....... *H04W 72/25* (2023.01); *H04W 72/1263* (2013.01); *H04W 76/20* (2018.02)

(58) Field of Classification Search
CPC . H04W 72/25; H04W 72/1263; H04W 76/20; H04W 56/001; H04W 72/23;
(Continued)

(56) References Cited

U.S. PATENT DOCUMENTS

2017/0289733 A1   10/2017   Rajagopal et al.
2018/0368090 A1   12/2018   Kadambar et al.
(Continued)

FOREIGN PATENT DOCUMENTS

CN      110831022 A    2/2020
WO    2019035678 A1    2/2019
(Continued)

OTHER PUBLICATIONS

PCT/CN2020/081546, "International Preliminary Report on Patentability", PCT Application No. PCT/CN2020/081546, Oct. 6, 2022, 5 pages.
(Continued)

*Primary Examiner* — Ayaz R Sheikh
*Assistant Examiner* — Mang Boi Thawng
(74) *Attorney, Agent, or Firm* — FIG. 1 Patents (57) ABSTRACT

The present disclosure is related to methods and apparatuses. According to some embodiments of the disclosure, a method includes: receiving sidelink control information (SCI) on a first interlace of a first set of interlaces on a carrier, wherein the SCI may schedule a second set of interlaces on the carrier for transmitting data; and receiving, based on the SCI, the data on the second set of interlaces, wherein each interlace of the first set of interlaces and the second set of interlaces may include evenly-spaced resource blocks (RBs) in frequency domain.

20 Claims, 6 Drawing Sheets

(58) Field of Classification Search
CPC . H04W 72/40; H04W 72/20; H04W 72/0453; H04L 5/0007; H04L 5/0092; H04L 5/0039; Y02D 30/70
See application file for complete search history.

(56) References Cited

U.S. PATENT DOCUMENTS

| | | | | |
|---|---|---|---|---|
| 2019/0037593 | A1* | 1/2019 | Yu | H04L 5/0092 |
| 2019/0150118 | A1* | 5/2019 | Nam | H04W 72/0446 |
| | | | | 370/329 |
| 2021/0091901 | A1* | 3/2021 | Sun | H04L 5/0094 |
| 2021/0092783 | A1* | 3/2021 | Sun | H04W 76/14 |
| 2021/0136732 | A1* | 5/2021 | Fakoorian | H04W 28/26 |
| 2022/0232558 | A1* | 7/2022 | Shin | H04L 5/0053 |

FOREIGN PATENT DOCUMENTS

| | | |
|---|---|---|
| WO | 2019036578 A1 | 2/2019 |
| WO | 2020032364 A1 | 2/2020 |
| WO | 2021055648 A1 | 3/2021 |

OTHER PUBLICATIONS

PCT/CN2020/081546 , "International Search Report and Written Opinion", PCT Application No. PCT/CN2020/081546, Dec. 31, 2020, 6 pages.

Samsung , "Details on resource pool design", 3GPP TSG RAN WG1 #85, R1-164764, Nanjing, China [retrieved Oct. 26, 2022]. Retrieved from the Internet <https://www.3gpp.org/ftp/tsg_ran/WG1_RL1/TSGR1_85/Docs/>., May 2016, 5 Pages.

20927752.4 , "Extended European Search Report", EP Application No. 20927752.4, Oct. 12, 2023, 10 pages.

202080099059.4 , "Foreign Office Action", CN Application No. 202080099059.4, Sep. 9, 2024, 14 pages.

Intel Corporation , "Sidelink physical structure for NR V2X communication", 3GPP TSG RAN WG1 Meeting #99, R1-1912203, Reno, Nevada, Nov. 2019, 34 pages.

"Foreign Office Action", CN Application No. 202080099059.4, Jan. 16, 2025, 14 pages.

* cited by examiner

METHOD AND APPARATUS FOR RESOURCE ALLOCATION FOR SIDELINK COMMUNICATION

TECHNICAL FIELD

The present disclosure generally relates to wireless communication technology, and more particularly to communication resource allocation for sidelink communication on an unlicensed spectrum.

BACKGROUND

In a wireless communication system, a communication device (e.g., user equipment (UE)) may communicate with another communication device via a data path supported by an operator's network, e.g., a cellular or a Wi-Fi network infrastructure. The data path supported by the operator network may include a base station (BS) and multiple gateways.

In sidelink communications, communication devices, which are relatively close to each other, may communicate with one another directly via a sidelink (SL), rather than being linked through the BS. The term "SL" may refer to a direct radio link established for communicating among devices, e.g., UEs, as opposed to communicating via the cellular infrastructure (uplink and downlink) as discussed above. The "SL" may also be referred to as a sidelink communication link. The sidelink communication link may be used in any suitable telecommunication network in accordance with various standards.

Sidelink communication may provide various advantages, for example, a relatively high transfer rate, a relatively low delay, etc. Moreover, during the sidelink communication, traffic concentrated at a base station can be distributed. Furthermore, a UE supporting sidelink communication may function as a relay node to extend the coverage of a base station.

BSs and UEs may operate in both a licensed spectrum and an unlicensed spectrum. There is a need for handling resource allocation for sidelink communication on an unlicensed spectrum.

SUMMARY

Some embodiments of the present disclosure provide a method. The method may include: receiving sidelink control information (SCI) on a first interlace of a first set of interlaces on a carrier, wherein the SCI may schedule a second set of interlaces on the carrier for transmitting data; and receiving, based on the SCI, the data on the second set of interlaces, wherein each interlace of the first set of interlaces and the second set of interlaces may include evenly-spaced resource blocks (RBs) in frequency domain.

The first set of interlaces may be configured by radio resource control (RRC) signaling, or predefined from a plurality of interlaces specified based on subcarrier spacing of the carrier, or the first set of interlaces includes all interlaces of the plurality of interlaces. In some embodiments of the present disclosure, the RRC signaling may indicate a corresponding index of each interlace in the first set of interlaces, or the RRC signaling may indicate a number of interlaces in the first set of interlaces. In some embodiments of the present disclosure, the first set of interlaces may be predefined in the form of corresponding index of each interlace in the first set of interlaces, or the first set of interlaces may be predefined in the form of a number of interlaces in the first set of interlaces.

In some embodiments of the present disclosure, the SCI may indicate a number of interlaces in the second set of interlaces or the SCI may indicate an interlace pattern index. The method may further include determining the second set of interlaces based on the SCI and a mapping between the first set of interlaces and the second set of interlaces. The mapping may be configured by radio resource control (RRC) signaling or the mapping may be predefined.

In some embodiments of the present disclosure, the SCI may indicate a number of one or more contiguous interlaces, and an index of a starting interlace of the one or more contiguous interlaces. In some embodiments of the present disclosure, the SCI may indicate a number of one or more contiguous interlaces. A starting interlace of the one or more contiguous interlaces may be an interlace next to the first interlace in the ascending order of interlace index, or the starting interlace of the one or more contiguous interlaces may be the first interlace. In some embodiments of the present disclosure, the second set of interlaces may include the one or more contiguous interlaces.

In some embodiments of the present disclosure, the second set of interlaces may at least include the first interlace, or the second set of interlaces may not include the first interlace. In some embodiments of the present disclosure, the SCI may be received on a single interlace.

Some embodiments of the present disclosure provide a method. The method may include: transmitting sidelink control information (SCI) on a first interlace of a first set of interlaces on a carrier, wherein the SCI may schedule a second set of interlaces on the carrier for transmitting data; and transmitting the data on the second set of interlaces according to the SCI; wherein each interlace of the first set of interlaces and the second set of interlaces may include evenly-spaced resource blocks (RBs) in frequency domain.

Some embodiments of the present disclosure provide an apparatus. The apparatus may include: at least one receiver, wherein the at least one receiver may receive sidelink control information (SCI) on a first interlace of a first set of interlaces on a carrier, wherein the SCI may schedule a second set of interlaces on the carrier for transmitting data; and may receive, based on the SCI, the data on the second set of interlaces, wherein each interlace of the first set of interlaces and the second set of interlaces may include evenly-spaced resource blocks (RBs) in frequency domain.

Some embodiments of the present disclosure provide an apparatus. The apparatus may include: at least one transmitter, wherein the at least one transmitter may transmit sidelink control information (SCI) on a first interlace of a first set of interlaces on a carrier, wherein the SCI may schedule a second set of interlaces on the carrier for transmitting data; and may transmit the data on the second set of interlaces according to the SCI; wherein each interlace of the first set of interlaces and the second set of interlaces may include evenly-spaced resource blocks (RBs) in frequency domain.

Some embodiments of the present disclosure provide an apparatus. According to some embodiments of the present disclosure, the apparatus may include: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions are configured to, with the at least one processor, to cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as 3GPP 5G (NR), 3GPP LTE Release 8, and so on. It is contemplated that along with the developments of network architectures and new service scenarios, all embodiments in the present disclosure are also applicable to similar technical problems; and moreover, the terminologies recited in the present disclosure may change, which should not affect the principle of the present disclosure.

Figure 1:
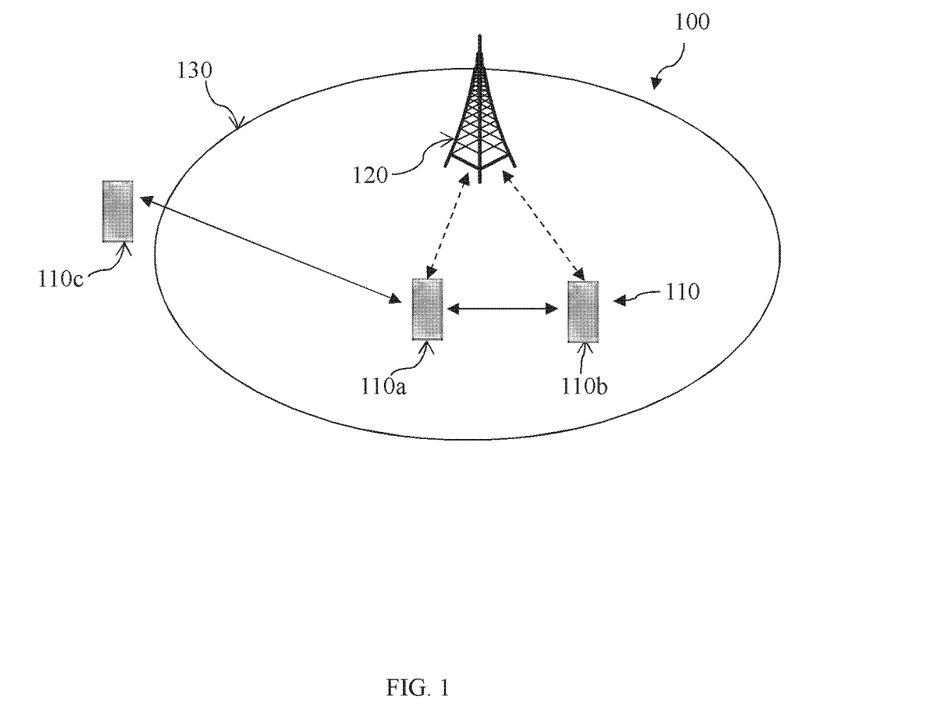
FIG. 1 illustrates a schematic diagram of a wireless communication system in accordance with some embodiments of the present disclosure.

FIG. 1 illustrates a schematic diagram of a wireless communication system 100 in accordance with some embodiments of the present disclosure.

As shown in FIG. 1, a wireless communication system 100 may include a base station (e.g., BS 120) and some UEs 110 (e.g., UE 110a, UE 110b, and UE 110c). Although a specific number of UEs 110 and one BS 120 are depicted in FIG. 1, it is contemplated that wireless communication system 100 may also include more BSs and more or fewer UEs in and outside of the coverage of the BSs.

The UEs and the base station may support communication based on, for example, 3G long-term evolution (LTE), LTE-advanced (LTE-A), new radio (NR), or other suitable protocol(s). For example, the BS 120 may include an eNB or a gNB. The UE 110a, UE 110b, or UE 110c may include, for example, but is not limited to, a computing device, a wearable device, a mobile device, an IoT device, a vehicle, etc. Persons skilled in the art should understand that as technology develops and advances, the terminologies described in the present disclosure may change, but should not affect or limit the principles and spirit of the present disclosure.

The BS 120 may define one or more cells, and each cell may have a coverage area 130. In the exemplary wireless communication system 100, some UEs (e.g., UE 110a and UE 110b) are within the coverage of the BS 120, which may not be a specific base station 120 shown in FIG. 1 and can be any one of the base stations 120 in a wireless communication system, and some UEs (e.g., UE 110c) are outside of the coverage of the BS 120. For example, in the case that the wireless communication system includes two base stations 120 with UE 110a being within the coverage of any one of the two base stations 120 means that UE 110a is within the coverage of a base station 120 (i.e., in-coverage) in the wireless communication system; and UE 110a being outside of the coverage of both base stations 120 means that UE 110a is out the coverage of a base station 120 (i.e., out-of-coverage) in the wireless communication system.

Still referring to FIG. 1, the UE 110a and UE 110b may communicate with the BS 120 via, for example, a Uu link (denoted by dotted arrow in FIG. 1). The UE 110a, UE 110b, and UE 110c may communicate with each other via a sidelink (denoted by solid arrow in FIG. 1), and may form a UE group. During a sidelink communication, a transmitting UE (hereinafter referred to as "Tx UE") may transmit signaling, data, or both to a receiving UE (hereinafter referred to as "Rx UE"). For example, referring to FIG. 1, a Tx UE (e.g., UE 110a) may transmit data to an Rx UE (e.g., UE 110b or UE 110c).

BSs (e.g., BS 120 in FIG. 1) and UEs (e.g., UE 110a, UE 110b, and UE 110c in FIG. 1) may operate in both a licensed spectrum and an unlicensed spectrum. For example, the unlicensed spectrum may be at around 6 GHz or 60 GHz of a carrier frequency. When communicating on an unlicensed spectrum, in order to achieve fair coexistence between NR (e.g., NR system access on unlicensed spectrum) systems and other wireless systems, a listen-before-talk (LBT) test is required before transmission on the unlicensed spectrum. For example, energy detection may be performed on a certain channel. If the received power of the channel is below a predefined threshold, the LBT test may be determined as successful, and the channel may then be deemed as empty and available for transmission. Only when the LBT test is successful can a device (e.g., a UE) start transmission on the channel and occupy the channel up to a maximum channel occupancy time (MCOT). Otherwise, that is, if the LBT test is failed, the device cannot start any transmission on the channel, and may continue to perform another LBT test until a successful LBT test result.

In addition, wireless transmission on an unlicensed spectrum should meet the requirements of the regulations subject to the management of the country/region where a wireless communication device (e.g., a UE) is located.

The requirements mainly include two aspects:
(1) occupied channel bandwidth (OCB): the bandwidth containing 99% of the power of the signal, shall be between 80% and 100% of the declared Nominal Channel Bandwidth; and (2) maximum power spectrum density (PSD) with a resolution bandwidth of 1 MHz (e.g., 10 dBm/MHz).

The above two requirements dictate that a signal which occupies a small portion of the channel bandwidth cannot be transmitted at the maximum available power at the UE due to the PSD and OCB constraints.

The design of an uplink waveform for NR-U (NR system access on unlicensed spectrum) PUSCH (Physical Uplink Shared Channel)/PUCCH (physical uplink control channel) should meet the above regulation requirements on an unlicensed spectrum. Similarly, the design of a waveform for sidelink communication should also meet the above regulation requirements on an unlicensed spectrum. There is a need for handling sidelink communication on an unlicensed spectrum.

Embodiments of the present disclosure provide solutions for applying an interlace-based waveform to sidelink communication on an unlicensed spectrum, so as to meet the above regulation requirements. More details on the embodiments of the present disclosure will be illustrated in the following text in combination with the appended drawings.

In some embodiments of the present disclosure, an interlace-based waveform may be applied to Rel-14 LTE enhanced licensed assisted access (LTE eLAA) as an uplink waveform for an unlicensed spectrum. In LTE, the bandwidth of a carrier is 20 MHz. The 20 MHz bandwidth may include 100 physical resource blocks (PRBs), which are partitioned into 10 interlaces. Each interlace may include 10 PRBs and may be equally distributed within the whole bandwidth. In this way, each interlace spans more than 80% system bandwidth so that the regulation requirements of OCB can be met. Moreover, 10 PRBs of one interlace are equally spaced in frequency so that two adjacent PRBs of one interlace are separated by 1.8 MHz distance, and thus power boosting can be realized for each PRB of one interlace.

In some embodiments of the present disclosure, to achieve power boosting under PSD constraint and meet the regulatory requirements for OCB in NR systems, an interlace-based waveform may be applied to uplink (UL) transmission, as well as sidelink communication. As frequency resource, an interlace may be defined as a set of common resource blocks (CRBs) which may be evenly spaced in frequency domain. The number of interlaces in frequency domain may be dependent on the subcarrier spacing.

For example, assuming that there are M interlaces, indexed as 0, 1, ..., M−1, an interlace m, m∈{0, 1, ..., M−1}, may consist of CRB {m, M+m, 2M+m, 3M+m, ...}. The relation between the interlaced resource block (IRB) $n_{IRB,m}^{\mu} \in \{0, 1, ...\}$ in bandwidth part (BWP) i, interlace m, and the common resource block $n_{CRB}^{\mu}$ is given by $n_{CRB}^{\mu} = M n_{IRB,m}^{\mu} + N_{BWP,i}^{start,\mu} + ((m - N_{BWP,i}^{start,\mu}) \mod M)$, where $N_{BWP,i}^{start,\mu}$ is the common resource block where bandwidth part i starts relative to common resource block 0; and μ indicates a subcarrier spacing (SCS). For example, "μ=0" may indicate a SCS of 15 kHz, "μ=1" may indicate a SCS of 30 kHz, "μ=2" may indicate a SCS of 60 kHz, and "μ=3" may indicate a SCS of 120 kHz. When there is no risk for confusion, the index μ may be dropped.

In some embodiments of the present disclosure, the number of interlaces distributed within the bandwidth of a carrier may be based on only the subcarrier spacing regardless of the bandwidth of the carrier. The subcarrier spacing of NR systems may be 15×$2^n$ kHz, where n is an integer. The subcarrier spacing may be 15 kHz, 30 kHz, or 60 kHz for frequency range 1 (FR1) and different subcarrier spacing values can support different maximum bandwidths. In some examples, for a carrier with 15 kHz subcarrier spacing, there may be 10 interlaces on the carrier. In some examples, for a carrier with 30 kHz subcarrier spacing, there may be 5 interlaces on the carrier. In some examples, for a carrier with 60 kHz subcarrier spacing, there may be 2 or 3 interlaces on the carrier. It should be understood that the number of interlaces (e.g., 10 interlaces for a carrier with 15 kHz subcarrier spacing, or 5 interlaces for a carrier with 30 kHz subcarrier spacing) is only for illustrative purposes, and should not be construed as limiting the embodiments of the present disclosure.

Table 1 below shows examples of NR bandwidth configurations for different subcarrier spacing. According to table 1, a maximum number of RBs (represented as NRB in table 1) may be determined based on the subcarrier spacing and corresponding bandwidth. For example, if the bandwidth is 20 MHz and the subcarrier spacing (SCS) is 15 kHz, the maximum number of RBs may be 106; and if the bandwidth is 20 MHz and the SCS is 30 kHz, the maximum number of RBs may be 51. It should be understood that table 1 is only for illustrative purposes, and should not be construed as limiting the embodiments of the present disclosure.

TABLE 1

| subcarrier spacing (SCS) (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 90 MHz $N_{RB}$ | 100 MHz $N_{RB}$ |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

In some embodiments of the present disclosure, the number of RBs of each interlace on a carrier may be dependent on the bandwidth of the carrier. For example, referring to table 1, if the carrier bandwidth is 20 MHz and the subcarrier spacing is 15 kHz, the maximum number of RBs included in the bandwidth may be 106. As mentioned above, for a carrier with 15 kHz subcarrier spacing, there may be 10 interlaces on the carrier. In this scenario, each of the 10 interlaces includes 10 or 11 RBs (106/10=10.6). If the carrier bandwidth is 20 MHz and the subcarrier spacing is 30 kHz, the maximum number of RBs included in the bandwidth may be 51. In this case, as mentioned above, for a carrier with 30 kHz subcarrier spacing, there may be 5 interlaces on the carrier. In this scenario, each of the 5 interlaces includes 10 or 11 RBs (51/5=10.2).

In some embodiments of the present disclosure, for carrier bandwidth larger than 20 MHz, the same spacing between consecutive RBs in an interlace is maintained for all interlaces regardless of the carrier bandwidth. In other words, the number of RBs per interlace may be dependent on the carrier bandwidth. Keeping the same interlace spacing with an increasing bandwidth is a straightforward and simple way to scale the interlace design from 20 MHz to a wider bandwidth.

For example, if the carrier bandwidth is 80 MHz and the subcarrier spacing is 30 kHz, according to table 1, the maximum number of RBs included in the bandwidth may be 217. Moreover, since the subcarrier spacing is 30 kHz, there are 5 interlaces on the carrier. In this scenario, each of the 5 interlaces may include 43 or 44 RBs (217/5=43.4).

Figure 2:
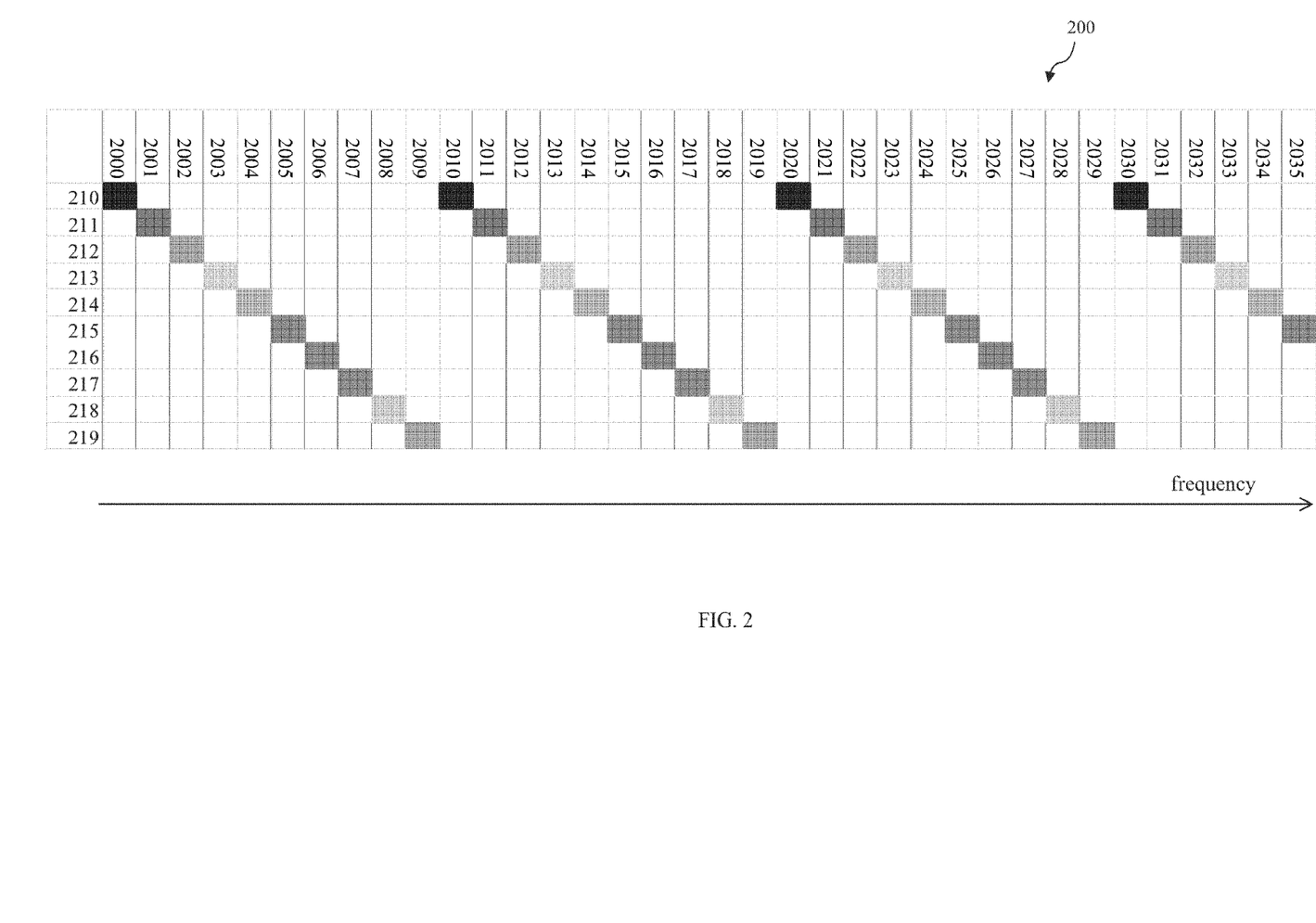
FIG. 2 illustrates an example of interlace-based resource block configuration according to some embodiments of the present disclosure.

FIG. 2 illustrates an example of interlace-based resource block configuration 200 for 15 kHz subcarrier spacing according to some embodiments of the present disclosure. It should be understood that configuration 200 is only for illustrative purposes, and should not be construed as limiting the embodiments of the present disclosure.

As shown in FIG. 2, carrier bandwidth may be partitioned into resource blocks (RBs). For an illustrative purpose, FIG. 2 only shows a part of the RBs (e.g., RBs that are represented with reference numerals 2000 to 2035 in FIG. 2) included in the carrier bandwidth. Persons skilled in the art can readily know the number of RBs included in a certain carrier bandwidth by referring to, for example, table 1 as shown above. For example, assuming that the carrier bandwidth is 15 MHz, the carrier bandwidth may include 79 RBs; and assuming that the carrier bandwidth is 20 MHz, the carrier bandwidth may include 106 RBs.

As mentioned above, the number of interlaces distributed within the bandwidth of a carrier may be based on only the subcarrier spacing regardless of the bandwidth of the carrier. In the example of FIG. 2, the RBs of the carrier bandwidth are partitioned into 10 interlaces (corresponding to the 15 kHz subcarrier spacing), which are represented with reference numerals 210, 211, 212, 213, 214, 215, 216, 217, 218, and 219 in FIG. 2.

Each interlace of the 10 interlaces may include evenly-spaced RBs in frequency domain. The number of RBs included in each of the 10 interlace may depend on the carrier bandwidth. As shown in FIG. 2, interlace 210 may include RB 2000, RB 2010, RB 2020, RB 2030, and so on; interlace 211 may include RB 2001, RB 2011, RB 2021, RB 2031, and so on; and interlace 219 may include RB 2009, RB 2019, RB 2029, and so on. RB 2000 to RB 2035 may be indexed from "0" to "35" along the frequency axis, and interlaces 210 to 219 may be indexed from "0" to "9."

When an unlicensed spectrum is extended to transmit sidelink control information (SCI) and associated data (e.g., physical sidelink shared channel (PSSCH)), the unit for resource allocation may be an interlace. For example, as shown in FIG. 2, interlace 210 may be used to transmit an SCI which may schedule interlace 211 for associated data transmission.

From the perspective of a Tx UE which transmits an SCI, the Tx UE may determine the interlace(s) for transmitting the SCI and the interlace(s) for associated data transmission. The Tx UE may also determine how to inform an Rx UE about the resource allocations regarding the above sidelink communication. From the perspective of an Rx UE which is expected to receive an SCI, the Rx UE may monitor interlaces distributed within the bandwidth of a carrier to detect interested SCI and associated data transmission. The Rx UE may determine the interlace(s) for associated data transmission after receiving the interested SCI on a certain interlace. Embodiments of the present disclosure provide solutions for handling resource allocation for the above sidelink communication on an unlicensed spectrum. More details on the embodiments of the present disclosure will be illustrated in the following text in combination with the appended drawings.

Figure 3:
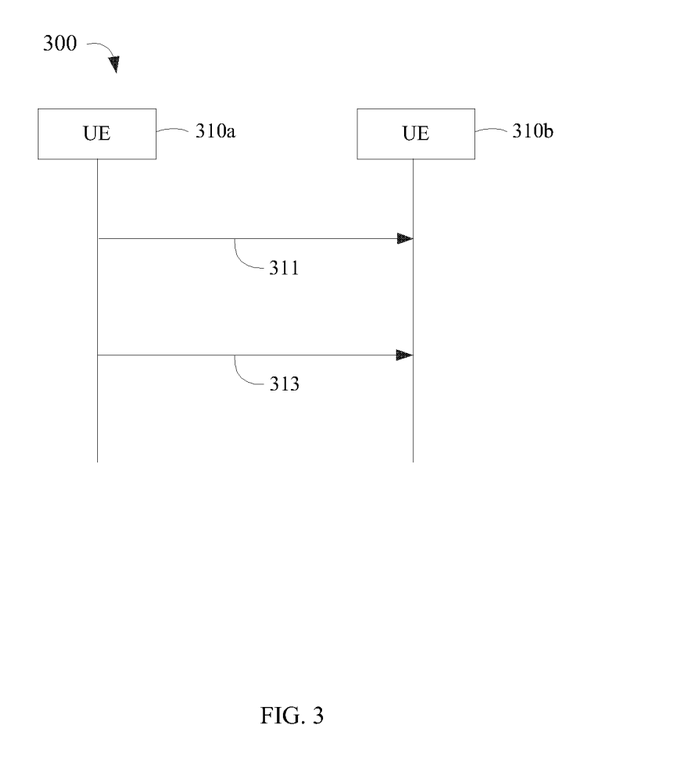
FIG. 3 illustrates a flow chart of an exemplary procedure for sidelink transmission according to some embodiments of the present disclosure.

FIG. 3 illustrates a flow chart of an exemplary procedure 300 for sidelink transmission according to some embodiments of the present disclosure.

The exemplary procedure 300 shows a procedure of a UE (e.g., UE 310a) communicating with another UE (e.g., UE 310b). In some examples, each of UE 310a and UE 310b may function as UE 110a, UE 110b, or UE 110c in FIG. 1. Details described in all of the foregoing embodiments of the present disclosure are applicable for the embodiments shown in FIG. 3.

Referring to FIG. 3, in operation 311, UE 310a may transmit sidelink control information (SCI) to UE 310b. The SCI may be transmitted on an interlace of a set of interlaces (hereinafter also referred to as "the set of interlaces for SCI transmission") on a carrier. The SCI may schedule another set of interlaces (hereinafter also referred to as "the set of interlaces for data transmission") on the carrier for transmitting data (e.g., physical sidelink shared channel (PSSCH)). The data transmission scheduled by a SCI may also be hereinafter referred to as "associated data transmission."

In some embodiments of the present disclosure, each interlace of the set of interlaces for SCI transmission and the set of interlaces for data transmission may include evenly-spaced RBs in frequency domain. For example, the interlace may be configured according to configuration 200 shown in FIG. 2.

In some embodiments of the present disclosure, the set of interlaces for SCI transmission may be configured by radio resource control (RRC) signaling, for example, from a base station (e.g., BS 120 in FIG. 1). For example, as mentioned above, a plurality of interlaces may be specified based on subcarrier spacing of the carrier (e.g., 10 interlaces for a carrier with 15 kHz subcarrier spacing). Each interlace of the plurality of interlaces may correspond to an interlace index. For example, the 10 interlaces for the carrier with 15 kHz subcarrier spacing may be indexed as "0" to "9." The set of interlaces for SCI transmission may be determined from the plurality of interlaces, and may be referred to as candidate interlaces for SCI transmission.

In some examples, the RRC signaling may indicate a corresponding index of each interlace in the set of interlaces for SCI transmission. In one example, the RRC signaling may indicate indices {0, 1, 2, 3, 4}. For example, referring to FIG. 2, interlaces 210, 211, 212, 213, 214 may be candidate interlaces for SCI transmission. In another example, the RRC signaling may indicate indices {0, 2, 4, 6, 8}. For example, referring to FIG. 2, interlaces 210, 212, 214, 216, 218 may be candidate interlaces for SCI transmission.

In some examples, the RRC signaling may indicate the number of interlaces in the set of interlaces for SCI transmission. A UE (e.g., UE 310a or UE 310b in FIG. 3) which receives the RRC signaling may determine the set of interlaces for SCI transmission based on a criterion. The criterion may be configured by a BS or may be predefined according to, for example, industrial standard(s).

For example, the RRC signaling may indicate the number "5." The UE may determine 5 interlaces with the lowest interlace indices in the plurality of interlaces as the candidate interlaces for SCI transmission. For example, referring to FIG. 2, interlaces 210, 211, 212, 213, 214 may be determined as the candidate interlaces for SCI transmission. Other criteria may be adopted. In some examples, the UE may determine 5 interlaces with the highest interlace indices in the plurality of interlaces as the candidate interlaces for SCI transmission. For example, referring to FIG. 2, interlaces 219, 218, 217, 216, 215 may be determined as the candidate interlaces for SCI transmission. In some other examples, the UE may determine one or more interlaces having odd indices or even indices in the plurality of interlaces, and may determine 5 interlaces with the lowest or highest interlace indices in the one or more interlaces as the candidate interlaces for SCI transmission.

In some embodiments of the present disclosure, the set of interlaces for SCI transmission may be predefined. For example, as mentioned above, a plurality of interlaces may be specified based on subcarrier spacing of a carrier (e.g., 10 interlaces for a carrier with 15 kHz subcarrier spacing). The set of interlaces for SCI transmission may be predefined from the plurality of interlaces according to, for example, industrial standard(s), and may be pre-configured during the manufacture of a UE.

In some examples, the set of interlaces for SCI transmission may be predefined in the form of a corresponding index of each interlace in the set of interlaces. For example, indices {0, 1, 2, 3, 4} or {0, 2, 4, 6, 8} may be pre-configured at a UE. In some other examples, the set of interlaces for SCI transmission may be predefined in the form of a number of interlaces in the first set of interlaces. For example, the number "5" may be pre-configured at a UE. The UE may determine the candidate interlaces for SCI transmission based on certain criteria as described above.

In some embodiments of the present disclosure, the set of interlaces for SCI transmission may include all interlaces of the plurality of interlaces specified based on subcarrier spacing of the carrier. For example, a UE may consider all 10 interlaces for a carrier with 15 kHz subcarrier spacing as the candidate interlaces for SCI transmission when the UE is not configured or pre-configured with interlaces for SCI transmission.

A UE (e.g., UE 310a in FIG. 3) may select an interlace from the set of interlaces for SCI transmission according to a certain criterion, for example, based on an ID of the UE in a UE group (e.g., by reducing the ID modulo to the total number of interlaces in the set of interlaces for SCI transmission), random selection of an interlace from the set of interlaces for SCI transmission, or an interlace with relatively low load or good channel condition. A UE (e.g., UE 310b in FIG. 3) may monitor possible SCI transmission on the set of interlaces for SCI transmission, instead of all interlaces of the plurality of interlaces. This is beneficial because it may reduce the effort on blind detection of SCI at a UE (e.g., UE 310b in FIG. 3), especially when the number of RBs in an interlace is relatively large due to a relatively wide carrier bandwidth.

In some embodiments of the present disclosure, an SCI may be transmitted on a single interlace. The associated data transmission may be transmitted any of the plurality of interlaces specified based on subcarrier spacing of the carrier. For example, a SCI may be transmitted on one of interlace 210 to interlace 219 in FIG. 2, which may be selected from the set of interlaces for SCI transmission. The associated data transmission may be transmitted on any of interlace 210 to interlace 219 in FIG. 2.

In some embodiments of the present disclosure, the set of interlaces for data transmission scheduled by a SCI may not include the interlace for transmitting the SCI. In other words, only frequency-division multiplexing (FDM) based SCI and associated data transmission is supported, and the associated data transmission may only be transmitted on interlace(s) other than the interlace for SCI transmission.

In some embodiments of the present disclosure, the set of interlaces for data transmission scheduled by a SCI may include the interlace for transmitting the SCI. In other words, in addition to FDM-based transmission, time-division multiplexing (TDM) based SCI and associated data transmission may also be supported, and the associated data transmission may also be transmitted on the interlace for SCI transmission. For example, a SCI may be transmitted on a certain interlace (e.g., interlace 210 in FIG. 2) in one or more symbols (e.g., orthogonal frequency division multiplexing (OFDM) symbols) within a slot. The associated data transmission may be transmitted on the same interlace (e.g., interlace 210 in FIG. 2) in the remaining symbols within the same slot. The associated data transmission may also be transmitted on one or more other interlaces (e.g., interlace 215 in FIG. 2).

Referring to FIG. 3, in operation 313, the UE 310a may transmit the data (e.g., PSSCH) scheduled by the SCI to UE 310b on the set of interlaces for data transmission. The SCI may indicate information related to the set of interlaces for data transmission.

In some embodiments of the present disclosure, a mapping or linkage between a set of interlaces for SCI transmission and a set of interlaces for data transmission (hereinafter also referred to as "interlace mapping") may be established. In some examples, the interlace mapping may be configured by RRC signaling, for example, by a BS. In some examples, the interlace mapping may be predefined, for example, according to industrial standard(s) at a UE.

The interlace mapping may be designed by taking into consideration of PSD requirements on an unlicensed spectrum (e.g., 10 dBm/MHz). The design principle may be to not only link one interlace for SCI transmission with another interlace for data transmission with mutual separation of at least larger than 1 MHz distance (i.e., meeting the PSD requirements), but also to guarantee orthogonal multi-UE multiplexing. Under such design, the SCI and associated data transmission can be transmitted separately with boosted power for respective coverage improvement.

Tables 2 and 3 below show examples of the interlace mapping between a set of interlaces for SCI transmission and a set of interlaces for data transmission. Tables 2 and 3 may be applied to a carrier with 15 kHz subcarrier spacing.

It should be understood that tables 2 and 3 are only for illustrative purposes, and should not be construed as limiting the embodiments of the present disclosure. It is also noted that in both table 2 and table 3, the interlace for SCI transmission is not used for the associated PSSCH transmission, e.g., in the case of FDM-based PSCCH/PSSCH multiplexing. For example, according to table 2, interlace 0 may be used for SCI transmission, and is not used for associated PSSCH transmission (e.g., in the case of two interlaces assigned for PSSCH, only interlaces 5 and 6 are used for PSSCH transmission). In some other embodiments of the present disclosure, the interlace for SCI transmission may also be used for associated PSSCH transmission, e.g., in the case of TDM or TDM+FDM based PSCCH/PSSCH multiplexing, in addition to the interlaces for PSSCH transmission as specified in table 2 and table 3. For example, when interlace 0 is used for SCI transmission, and two-interlace PSSCH transmission is indicated in the SCI, then in addition to both interlace 5 and interlace 6, interlace 0 may be also used for associated PSSCH transmission. Herein, there are N+1 interlaces actually assigned for PSSCH transmission, i.e., N interlaces indicated by the SCI format plus the interlace for SCI transmission.

TABLE 2

| Interlace for SCI | 1-Interlace PSSCH | 2-Interlace PSSCH | 3-interlace PSSCH | 5-interlace PSSCH | 7-Interlace PSSCH | 9-interlace PSSCH |
|---|---|---|---|---|---|---|
| 0 | 5 | 5, 6 | 1, 5, 6 | 3, 5, 6, 7, 8 | 1, 2, 3, 5, 6, 7, 8 | 1, 2, 3, 4, 5, 6, 7, 8, 9 |
| 1 | 6 | — | — | — | — | — |
| 2 | 7 | 7, 8 | 3, 7, 8 | — | — | — |
| 3 | 8 | — | — | — | — | — |
| 4 | 9 | — | — | — | — | — |

TABLE 3

| Interlace for SCI | 1-Interlace PSSCH | 2-Interlace PSSCH | 3-interlace PSSCH | 5-interlace PSSCH | 7-Interlace PSSCH | 9-interlace PSSCH |
|---|---|---|---|---|---|---|
| 0 | 5 | 5, 6 | 1, 5, 6 | 3, 5, 6, 7, 8 | 1, 2, 3, 5, 6, 7, 8 | 1, 2, 3, 4, 5, 6, 7, 8, 9 |
| 2 | 7 | 7, 8 | 3, 7, 8 | — | — | — |
| 4 | 9 | — | — | — | — | — |
| 6 | 1 | — | — | — | — | — |
| 8 | 3 | — | — | — | — | — |

In table 2, the set of interlaces for SCI transmission is {0, 1, 2, 3, 4}. In other words, a LIE may select an interlace from interlaces indexed as {0, 1, 2, 3, 4} for SCI transmission; and may monitor SCI transmission on interlaces indexed as {0, 1, 2, 3, 4}. In table 3, the set of interlaces for SCI transmission is {0, 2, 4, 6, 8}.

In the above table 2, when a SCI is transmitted on an interlace (hereinafter, "SCI interlace") indexed as "0" and schedules data (e.g., PSSCH) transmission on two interlaces (that is, schedules 2-interlace PSSCH), the indices of interlaces in the set of interlaces for data transmission are "5" and "6." In the above table 3, when a SCI is transmitted on an interlace indexed as "2" and schedules data (e.g., PSSCH) transmission on two interlaces (that is, schedules 2-interlace PSSCH), the indices of interlaces in the set of interlaces for data transmission are "7" and "8."

Moreover, in above tables 2 and 3, the distances (5 interlaces) between SCI interlace and associated 1-interlace PSSCH and 2-interlace PSSCH are kept nearly equal to 1 MHz bandwidth. It should be understood that when more than one interlace is scheduled for data transmission, the interlace for SCI transmission should be kept at a relatively large distance to associated PSSCH interlaces, so as to boost the power of SCI transmission.

By referring to the interlace mapping (e.g., the above table 2 or table 3) and an SCI, a UE which receives the SCI (e.g., UE 310b in FIG. 3) may determine a set of interlaces on which a UE (e.g., UE 310a in FIG. 3) which transmits the SCI transmits the associated data. On the other hand, a UE (e.g., UE 310a in FIG. 3) may select an interlace for transmitting the SCI, determine a set of interlaces for data transmission based on the interlace mapping, and indicate information related to the set of interlaces for data transmission in the SCI, and may transmit the associated data on the set of interlaces for data transmission.

In some embodiments of the present disclosure, the SCI may include a field indicating the number of interlaces in the set of interlaces for data transmission. For example, assuming that a SCI is transmitted on an interlace indexed as "0," and indicates the number of interlaces in the set of interlaces for data transmission as "3," it can be determined that the set of interlaces for data transmission may include interlaces indexed as "1," "5," and "6," according to table 2 or table 3.

The number of bits for this field may be dependent on the number of maximum linkages per SCI interlace in the interlace mapping. For example, referring to table 2 or table 3, the number of maximum linkages per SCI interlace is 6 (e.g., in table 2, when SCI is transmitted on interlace 0, there are six possible linkages between the interlace for SCI transmission and the interlaces for data transmission, corresponding to "1-interlace PSSCH," "2-interlace PSSCH," "3-interlace PSSCH," "5-interlace PSSCH," "7-interlace PSSCH," and "9-interlace PSSCH" allocations in the table). When table 2 or table 3 is employed as the interlace mapping, the number of bits for this field may be set as 3 bits, which can support up to eight linkages per SCI interlace). In some other examples, assuming that a SCI only schedules up to 5 interlaces for data transmission (e.g., the last two columns are removed from table 2 or table 3), the number of bits for this field may be set as 2 bits, which can support up to four linkages per SCI interlace, for example, correspond to "1-interlace PSSCH," "2-interlace PSSCH," "3-interlace PSSCH," and "5-interlace PSSCH" allocations.

In some embodiments of the present disclosure, the SCI may include a field indicating an interlace pattern index. For example, referring to table 2 or table 3, the "1-interlace PSSCH," "2-interlace PSSCH," "3-interlace PSSCH," "5-interlace PSSCH," "7-interlace PSSCH," and "9-interlace PSSCH" allocations may be indexed as 6 interlace patterns, e.g., interlace patterns 0, 1, 2, 3, 4, 5 and 6, respectively. Assuming that a SCI is transmitted on an interlace indexed as "0," and indicates an interlace pattern "1," it can be determined that the set of interlaces for data transmission may include interlaces indexed as "5," and "6," according to table 2 or table 3.

The number of bits for this field may be dependent on the maximum number of patterns per SCI interlace in the interlace mapping. When table 2 or table 3 is employed as the interlace mapping, the number of bits for this field may be set as 3 bits (which can support up to eight patterns per SCI interlace). In some other examples, assuming that a SCI only schedules up to 5 interlaces for data transmission (e.g., the last two columns are removed from table 2 or table 3), the number of bits for this field may be set as 2 bits, which can support up to four patterns per SCI interlace, for example, corresponding to interlace patterns "0," "1," "2," and "3."

In some embodiments of the present disclosure, the SCI may include a field indicating one or more contiguous interlaces. The one or more contiguous interlaces may be used for associated data transmission. In other words, the set of interlaces for data transmission may include the one or more contiguous interlaces.

In some embodiments of the present disclosure, the field may be a resource allocation field, and may indicate the number of the one or more contiguous interlaces, and an index of a starting interlace of the one or more contiguous interlaces. Assuming that there are 10 interlaces for a carrier with the 15 kHz subcarrier spacing, the number of bits for the field may be set as 6 bits, to indicate a range between a minimum one interlace to a maximum 10 contiguous interlaces. For example, referring to FIG. 3, UE 310a may transmit to UE 310b an SCI indicating a number "2" and an interlace index "5." UE 310b may determine that associated data transmission is transmitted from UE 310a on interlaces indexed as "5" and "6" (e.g., interlaces 215 and 216 in FIG. 2).

In some embodiments of the present disclosure, the field may indicate the number of the one or more contiguous interlaces. Assuming that there are 10 interlaces for a carrier with 15 kHz subcarrier spacing, the number of bits for the field may be set as 3 bits, to indicate a range between a minimum one interlace to a maximum 8 contiguous interlaces. The starting interlace of the one or more contiguous interlaces may be determined implicitly at a UE, for example, according to certain criteria. The criteria may be configured by a BS or may be predefined according to, for example, industrial standard(s).

In some examples, the starting interlace of the one or more contiguous interlaces may be an interlace next to the SCI interlace in the ascending order of an interlace index. For example, assuming that a UE receives an SCI on an interlace indexed as X (e.g., interlace 210 in FIG. 2), the UE may determine that the starting interlace of the one or more contiguous interlaces is an interlace indexed as X+1 (e.g., interlace 211 in FIG. 2).

In some examples, the starting interlace of the one or more contiguous interlaces may be the SCI interlace. For example, assuming that a UE receives an SCI on an interlace indexed as X (e.g., interlace 210 in FIG. 2), the UE may determine that the starting interlace of the one or more contiguous interlaces is the interlace indexed as X (e.g., interlace 210 in FIG. 2).

It should be appreciated by persons skilled in the art that the sequence of the operations in exemplary procedure 300 may be changed and some of the operations in exemplary procedure 300 may be eliminated or modified, without departing from the spirit and scope of the disclosure.

Figure 4:
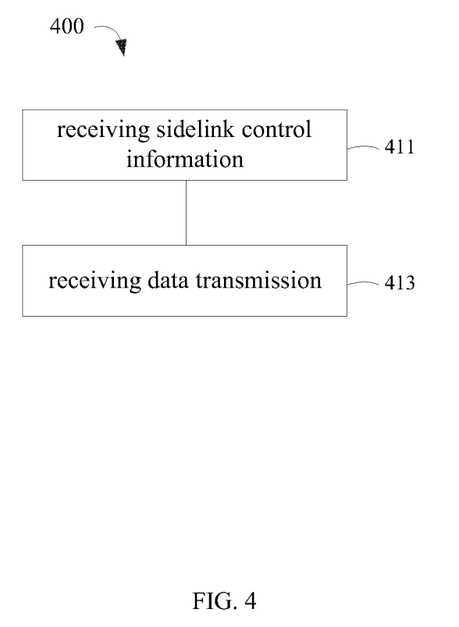
FIG. 4 illustrates a flow chart of a method for wireless communications according to some embodiments of the present disclosure.

FIG. 4 illustrates a flow chart of an exemplary procedure 400 for wireless communications according to some embodiments of the present disclosure.

The exemplary procedure 400 shows a procedure of a UE (e.g., UE 310b in FIG. 3) communicating with another UE (e.g., UE 310a in FIG. 3). Details described in all of the foregoing embodiments of the present disclosure are applicable for the embodiments shown in FIG. 4.

Referring to FIG. 4, in operation 411, a UE (e.g., UE 310b in FIG. 3) may receive sidelink control information (SCI) scheduling a set of interlaces for data transmission on a carrier. The UE may monitor SCI on a set of interlaces for SCI transmission, and may receive the SCI on an interlace of the set of interlaces for SCI transmission. The set of interlaces for SCI transmission may be configured by a RRC signaling, or may be predefined from a plurality of interlaces specified based on subcarrier spacing of the carrier, or may include all interlaces of the plurality of interlaces, as described above with respect to FIGS. 2 and 3.

The SCI may indicate information related to the set of interlaces for data transmission as described above with respect to FIGS. 2 and 3. In some embodiments of the present disclosure, the UE may determine the set of interlaces for data transmission based on the SCI according to one of the methods described above with respect to FIGS. 2 and 3. In operation 413, the UE may receive data transmission on the set of interlaces for data transmission.

It should be appreciated by persons skilled in the art that the sequence of the operations in exemplary procedure 400 may be changed and some of the operations in exemplary procedure 400 may be eliminated or modified, without departing from the spirit and scope of the disclosure.

Figure 5:
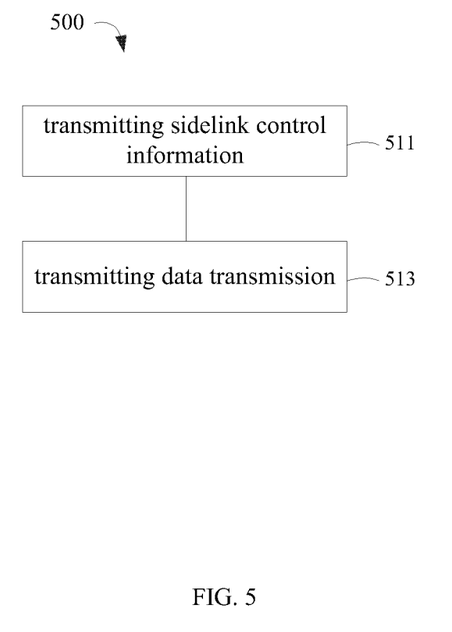
FIG. 5 illustrates a flow chart of a method for wireless communications according to some embodiments of the present disclosure.

FIG. 5 illustrates a flow chart of an exemplary procedure 500 for wireless communications according to some embodiments of the present disclosure.

The exemplary procedure 500 shows a procedure of a UE (e.g., UE 310a in FIG. 3) communicating with another UE (e.g., UE 310b in FIG. 3). Details described in all of the foregoing embodiments of the present disclosure are applicable for the embodiments shown in FIG. 5.

Referring to FIG. 5, a UE (e.g., UE 310a in FIG. 3) may transmit sidelink control information (SCI) on an interlace from a set of interlaces for SCI transmission. The set of interlaces for SCI transmission may be configured by a RRC signaling, or may be predefined from a plurality of interlaces specified based on subcarrier spacing of a carrier, or may include all interlaces of the plurality of interlaces, as described above with respect to FIGS. 2 and 3. The UE may select the interlace from the set of interlaces for SCI transmission based on certain criteria.

The SCI may schedule a set of interlaces for data transmission, and may indicate information related to the set of interlaces for data transmission as described above with respect to FIGS. 2 and 3. In operation 513, the UE may transmit data transmission on the set of interlaces for data transmission.

It should be appreciated by persons skilled in the art that the sequence of the operations in exemplary procedure 500 may be changed and some of the operations in exemplary procedure 500 may be eliminated or modified, without departing from the spirit and scope of the disclosure.

Figure 6:
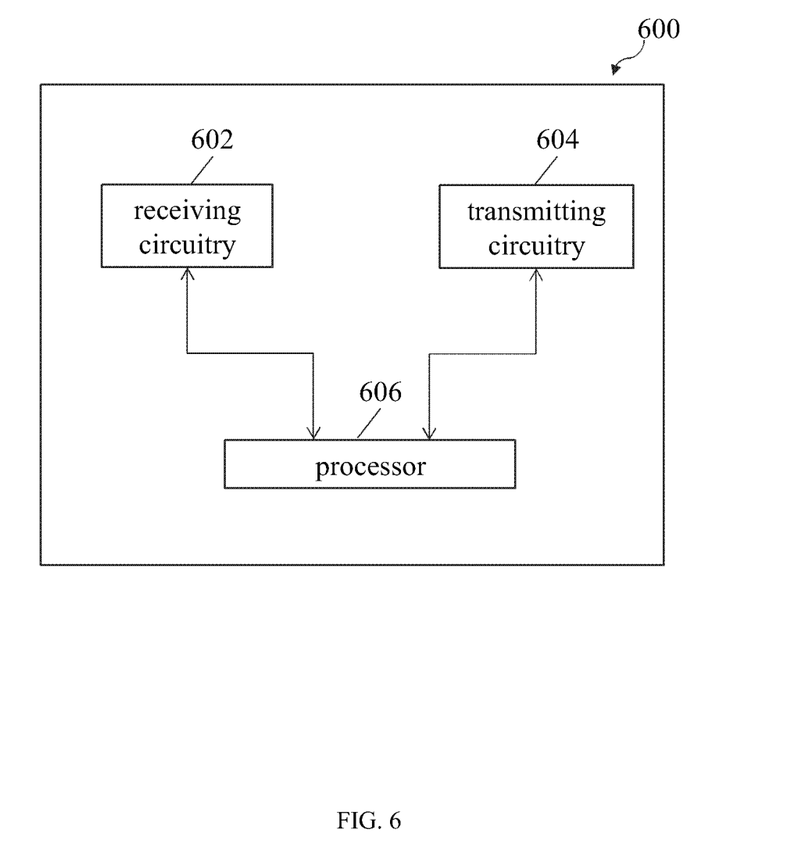
FIG. 6 illustrates a block diagram of an exemplary apparatus in accordance with some embodiments of the present disclosure.

FIG. 6 illustrates an example block diagram of an apparatus 600 according to some embodiments of the present disclosure.

As shown in FIG. 6, the apparatus 600 may include at least one non-transitory computer-readable medium (not illustrated in FIG. 6), at least one receiving circuitry 602, at least one transmitting circuitry 604, and at least one processor 606 coupled to the non-transitory computer-readable medium (not illustrated in FIG. 6), the receiving circuitry 602 and the transmitting circuitry 604. The apparatus 600 may be a UE.

Although in this figure, elements such as the at least one processor 606, transmitting circuitry 604, and receiving circuitry 602 are described in the singular, the plural is contemplated unless limitation to the singular is explicitly stated. In some embodiments of the present disclosure, the receiving circuitry 602 and the transmitting circuitry 604 are combined into a single device, such as a transceiver. In certain embodiments of the present disclosure, the apparatus 600 may further include an input device, a memory, and/or other components.

In some embodiments of the present disclosure, the non-transitory computer-readable medium may have stored thereon computer-executable instructions to cause a processor to implement the operations with respect to the UE as described above. For example, the computer-executable instructions, when executed, cause the processor 606 interacting with receiving circuitry 602 and transmitting circuitry 604, to perform the operations with respect to the UE depicted in FIGS. 1-5.

In some examples, the receiving circuitry 602 may receive sidelink control information (SCI) on an interlace of a set of interlaces on a carrier. The SCI may schedule another set of interlaces on the carrier for transmitting data. Each interlace of the set of interlaces and the another set of interlaces may include evenly-spaced resource blocks (RBs) in frequency domain. In some embodiments of the present disclosure, the processor 606 may determine the another set of interlaces based on the SCI according to one of the methods described above with respect to FIGS. 1-5. The receiving circuitry 602 may further receive the data on the another set of interlaces.

In some examples, the transmitting circuitry 604 may transmit sidelink control information (SCI) on an interlace of a set of interlaces for SCI transmission on a carrier. The SCI may schedule another set of interlaces on the carrier for transmitting data. Each interlace of the set of interlaces and the another set of interlaces may include evenly-spaced resource blocks (RBs) in frequency domain. In some embodiments of the present disclosure, the processor 606 may determine the SCI interlace from the set of interlaces for SCI transmission, and may determine the another set of interlaces for data transmission according to one of the methods described above with respect to FIGS. 1-5. The SCI may indicate information related to the another set of interlaces for data transmission. The transmitting circuitry 604 may further transmit the data on the another set of interlaces.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including".

What is claimed is:

1. A method, comprising:
  receiving sidelink control information (SCI) on a first interlace of a first set of interlaces on a carrier, wherein the SCI schedules a second set of interlaces on the carrier for transmitting data based on an interlace mapping between the first set of interlaces and the second set of interlaces, the SCI includes a field indicating a number of interlaces in the first set and the second set of interlaces for data transmission, and a number of bits for the field is dependent on a number of maximum linkages per SCI interlace in the interlace mapping; and
  receiving, based on the SCI, the data on the second set of interlaces,
  wherein each interlace of the first set of interlaces and the second set of interlaces comprises evenly-spaced resource blocks (RBs) in frequency domain.

2. The method of claim 1, wherein one or more of: the first set of interlaces is configured by radio resource control (RRC) signaling, or predefined from a plurality of interlaces specified based on subcarrier spacing of the carrier, or the first set of interlaces includes all interlaces of the plurality of interlaces.

3. An apparatus, comprising:
  a receiving circuitry; and
  a processor connected to the receiving circuitry, the processor and the receiving circuitry configured to cause the apparatus to:
    receive sidelink control information (SCI) on a first interlace of a first set of interlaces on a carrier, wherein the SCI schedules a second set of interlaces on the carrier for transmitting data based on an interlace mapping between the first set of interlaces and the second set of interlaces, the SCI includes a field indicating a number of interlaces in the first set and the second set of interlaces for data transmission, and a number of bits for the field is dependent on a number of maximum linkages per SCI interlace in the interlace mapping; and
    receive, based on the SCI, the data on the second set of interlaces,
  wherein each interlace of the first set of interlaces and the second set of interlaces comprises evenly-spaced resource blocks (RBs) in frequency domain.

4. The apparatus of claim 3, wherein one or more of: the first set of interlaces is configured by radio resource control (RRC) signaling or predefined from a plurality of interlaces specified based on subcarrier spacing of the carrier, or the first set of interlaces includes all interlaces of the plurality of interlaces.

5. The apparatus of claim 4, wherein the RRC signaling indicates one or more of a corresponding index of each interlace in the first set of interlaces, or a number of interlaces in the first set of interlaces.

6. The apparatus of claim 4, wherein the first set of interlaces is predefined in a form of one or more of a corresponding index of each interlace in the first set of interlaces, or a number of interlaces in the first set of interlaces.

7. The apparatus of claim 3, wherein the SCI is received on a single interlace, and the SCI indicates one or more of a number of interlaces in the second set of interlaces or an interlace pattern index.

8. The apparatus of claim 7, wherein the processor is configured to cause the apparatus to determine the second set of interlaces based on the SCI and a mapping between the first set of interlaces and the second set of interlaces.

9. The apparatus of claim 8, wherein the mapping is one or more of configured by radio resource control (RRC) signaling or predefined.

10. The apparatus of claim 3, wherein the SCI indicates a number of one or more contiguous interlaces, and an index of a starting interlace of the one or more contiguous interlaces.

11. The apparatus of claim 3, wherein the SCI indicates a number of one or more contiguous interlaces, and wherein:

a starting interlace of the one or more contiguous interlaces is an interlace next to the first interlace in an ascending order of interlace index, or the starting interlace of the one or more contiguous interlaces is the first interlace; and the second set of interlaces includes the one or more contiguous interlaces.

12. An apparatus, comprising:

a receiving circuitry; and a processor connected to the receiving circuitry, the processor and the receiving circuitry configured to cause the apparatus to:

transmit sidelink control information (SCI) on a first interlace of a first set of interlaces on a carrier, wherein the SCI schedules a second set of interlaces on the carrier for transmitting data based on an interlace mapping between the first set of interlaces and the second set of interlaces, the SCI includes a field indicating a number of interlaces in the first set and the second set of interlaces for data transmission, and a number of bits for the field is dependent on a number of maximum linkages per SCI interlace in the interlace mapping; and transmit the data on the second set of interlaces according to the SCI;

wherein each interlace of the first set of interlaces and the second set of interlaces comprises evenly-spaced resource blocks (RBs) in frequency domain.

13. The apparatus of claim 12, wherein one or more of: the first set of interlaces is configured by radio resource control (RRC) signaling or predefined from a plurality of interlaces specified based on subcarrier spacing of the carrier, or the first set of interlaces includes all interlaces of the plurality of interlaces.

14. The apparatus of claim 13, wherein the RRC signaling indicates one or more of a corresponding index of each interlace in the first set of interlaces, or a number of interlaces in the first set of interlaces.

15. The apparatus of claim 13, wherein the first set of interlaces is predefined in a form of one or more of a corresponding index of each interlace in the first set of interlaces or a number of interlaces in the first set of interlaces.

16. The apparatus of claim 12, wherein the SCI is transmitted on a single interlace, and the SCI indicates one or more of a number of interlaces in the second set of interlaces or an interlace pattern index.

17. The apparatus of claim 16, wherein the second set of interlaces is based on the SCI and a mapping between the first set of interlaces and the second set of interlaces.

18. The apparatus of claim 17, wherein the mapping is configured by one or more of radio resource control (RRC) signaling or predefined.

19. The apparatus of claim 12, wherein the SCI indicates a number of one or more contiguous interlaces, and an index of a starting interlace of the one or more contiguous interlaces.

20. The apparatus of claim 12, wherein the SCI indicates a number of one or more contiguous interlaces, and wherein:

a starting interlace of the one or more contiguous interlaces is an interlace next to the first interlace in an ascending order of interlace index, or the starting interlace of the one or more contiguous interlaces is the first interlace; and the second set of interlaces includes the one or more contiguous interlaces.

* * * * *